(12) United States Patent
Park et al.

(10) Patent No.: US 6,807,723 B2
(45) Date of Patent: Oct. 26, 2004

(54) APPARATUS FOR PRODUCING A HONEYCOMB BODY

(75) Inventors: Won-Wook Park, Changwon-shi (KR); Byoung-Gi Moon, Changwon-shi (KR); Ha-Sik Kim, Masan-shi (KR)

(73) Assignee: Korean Institute of Machinery and Materials (KR)

( * ) Notice: Subject to any disclaimer, the term of this patent is extended or adjusted under 35 U.S.C. 154(b) by 377 days.

(21) Appl. No.: 09/881,566

(22) Filed: Jun. 13, 2001

(65) Prior Publication Data

US 2002/0050158 A1 May 2, 2002

(30) Foreign Application Priority Data

Jun. 13, 2000 (KR) ........................................ 2000/32330

(51) Int. Cl.[7] .............................................. B65H 61/00

(52) U.S. Cl. ............................... 29/709; 29/714; 29/890; 29/407.01; 502/527.19; 242/364.9; 242/484.9; 242/534.2

(58) Field of Search ...................... 29/2.2, 890, 487.01, 29/407.05, 407.09, 407.1, 709, 714, 771; 502/527.19; 422/180, 222; 242/159, 160.4, 361, 361.2, 361.3, 361.4, 364.9, 388.9, 484.9, 487.5, 534.2, 357, 413.3

(56) References Cited

U.S. PATENT DOCUMENTS

| | | | |
|---|---|---|---|
| 3,595,492 A | * | 7/1971 | Furst ........................ 242/534.2 |
| 4,459,842 A | * | 7/1984 | Kihara et al. ..................... 73/7 |
| 4,477,147 A | | 10/1984 | Winter et al. |
| 4,535,949 A | * | 8/1985 | Olsson ...................... 242/534.2 |
| 4,567,630 A | | 2/1986 | Ishida et al. |
| 4,711,009 A | * | 12/1987 | Cornelison et al. ............ 29/890 |
| 4,719,680 A | * | 1/1988 | Cyron .......................... 29/890 |
| 4,726,105 A | | 2/1988 | Yamanaka et al. |
| 4,824,011 A | * | 4/1989 | Maus et al. .................... 29/890 |
| 5,316,997 A | | 5/1994 | Toyoda et al. |
| 5,366,700 A | | 11/1994 | Humpolik et al. |
| 5,402,928 A | * | 4/1995 | Preston et al. ................. 29/890 |
| 5,409,759 A | | 4/1995 | Kondo et al. |
| 5,516,383 A | | 5/1996 | Jha et al. |
| 5,611,500 A | * | 3/1997 | Smith ....................... 242/534.2 |
| 5,618,498 A | | 4/1997 | Konya et al. |
| 5,718,027 A | | 2/1998 | Laumann |
| 5,881,442 A | | 3/1999 | Hultberg et al. |
| 6,405,919 B2 | | 6/2002 | Frohne et al. |

FOREIGN PATENT DOCUMENTS

| | | | |
|---|---|---|---|
| EP | 526 984 | 3/1999 | |
| JP | 361203052 A1 | * 9/1986 | ................. 242/547 |
| JP | 04-371234 | 6/1991 | |
| JP | 04-122918 | 4/1992 | |
| JP | 05-220404 | 8/1993 | |
| JP | 06-000390 | 1/1994 | |

(List continued on next page.)

*Primary Examiner*—Gregory Vidovich
*Assistant Examiner*—Jermie E. Cozart
(74) *Attorney, Agent, or Firm*—Meyertons, Hood, Kivlin, Kowert & Goetzel, P.C.; Eric B. Meyertons

(57) ABSTRACT

The present invention relates to an apparatus for producing a honeycomb body, which comprises a roll part for supplying a thin metal flat sheet via several rolls; a part for measuring the length of feed of the flat sheet which is fed through said roll part for supplying a flat sheet; a roll part for supplying a corrugated sheet to overlap the same onto said flat sheet via several rolls; a winding roll of a honeycomb body which is made by folding the overlapping flat and corrugated sheets in feed into a roll; a part for measuring the rotation angle of said winding roll; and a control part, which is connected respectively to said part for measuring the length and said part for measuring the rotation angle, wherein said control part controls the amount of winding of a honeycomb body by receiving and computing the measurement values therefrom.

15 Claims, 3 Drawing Sheets

FOREIGN PATENT DOCUMENTS

| | | |
|---|---|---|
| JP | 06-000391 | 1/1994 |
| JP | 06-047284 | 2/1994 |
| JP | 06-182222 | 7/1994 |
| JP | 06-269683 | 9/1994 |
| JP | 06-277527 | 10/1994 |
| JP | 08-206512 | 8/1996 |
| JP | 408225239 A1 * | 9/1996 |
| JP | 06-238174 | 8/1997 |

* cited by examiner

APPARATUS FOR PRODUCING A HONEYCOMB BODY

BACKGROUND OF THE INVENTION

1. Field of the Invention

The present invention relates to an apparatus for producing a honeycomb body used in catalytic purification of exhaust gas of an internal combustion engine. In particular, the present invention relates to an apparatus for producing a honeycomb body, which can produce precise dimensions for accurately inserting said honeycomb body of a spiral form into a metal outer shell, wherein said honeycomb body is made by folding a flat sheet and a corrugated sheet into a roll.

2. Description of the Related Art

In general, the support for catalytic purification of exhaust gas includes an outer shell of a cylindrical metal material, wherein a honeycomb body is inserted and joined thereto. The methods of inserting a honeycomb body into a metal outer shell can be classified into two main types. First is a method of inserting a honeycomb body into a pre-joined outer shell in the shape of a pipe as described in Japanese Patent Nos. 5-228376, 6-390, 6-391, 6-47284, 6-63421, 6-182222, 6-238174, 7-24330, 8-206512; and U.S. Pat. No. 5,366,700, which is incorporated by reference as if fully set forth herein. Second is a method of inserting a honeycomb body into a non-joined outer shell in the shape of a "C" or into an outer shell of several pieces cut lengthwise, followed later by joining of the outer shell as described in Japanese Patent Nos. 4-122418, 5-220404, 6-269683, 6-277527; and U.S. Pat. No. 5,316,997, which is incorporated by reference as if fully set forth herein.

If the outer diameter of the honeycomb body is less than the inner diameter of the outer shell, the outer shell and the honeycomb may become separated due to improper joining therein. On the other hand, if the outer diameter of the honeycomb is larger than the inner diameter of the outer shell, it is impossible to insert the honeycomb into the outer shell without damaging the shape thereof. Even if a forceful insertion can be made with ensuing damages to the shape, it would be followed by non-uniformity with respect to overall joining which may cause problems for permeability.

For this reason, it is desirable to produce a honeycomb with a certain set of dimensions. The methods used may be classified into two major types. The first method involves direct control by measuring the diameter or radius of the honeycomb body in a roll (hereinafter referred to as a method of measuring outer diameter, Japanese Patent No. 4-371234, which is incorporated by reference as if fully set forth herein). The second method involves indirect control over the length of the strip used during the winding process of a honeycomb body (hereinafter referred to as a method of measuring length).

The method of measuring the outer diameter involves a honeycomb body, produced by a winding process, which is of a warped spiral shape, and not a round form. Hence, even if a honeycomb body were to be produced, which perfectly matches the inner diameter of an outer shell at one point of measurement, it would be considerably larger or lesser than the inner diameter of the outer shell at some other points of measurement. Consequently, it is very difficult to insert a honeycomb body into the outer shell, although it may potentially be capable of accurate insertion into the outer shell. Moreover, even if a standard for accurate insertion into the outer shell could be made by many trials and errors, there still is the disadvantage of necessarily carrying out another set of trials and errors due to the changes in the dimensions of the outer shell. Therefore, this method may be applied to mass production of a small number of limited product types, yet may be inappropriate for small-lot production of a variety of product types.

The method of measuring length obviously brings about many trials and errors due to its indirect control method. However, there is a problem relating to tension in effect during the winding process. It is necessary to control the tension to the flat sheet or corrugated sheet during the winding process in order to increase its structural tightness and mechanical strength. In this case, if the tension being controlled changes to the slightest extent, the size of the cell changes. As the size of the cell changes, the length of the strip used to produce honeycomb bodies of the same dimensions changes. Consequently, it becomes difficult to control the dimensions of a honeycomb by using the length of the strip used in the overall process. Therefore, in using the method of measuring length, it is impossible to consistently produce honeycomb bodies with a certain set of dimensions if the reproduction is not carried out perfectly with respect to additional conditions of tension from the start of the winding process to its end.

SUMMARY OF THE INVENTION

An embodiment includes an apparatus for producing a honeycomb body, which can produce precise dimensions for accurately inserting the same into a metal outer shell, wherein a spiral shaped honeycomb body is made by folding a flat sheet and-a corrugated sheet into a roll.

The embodiment includes a roll part for supplying a thin metal flat sheet via several rolls; a part for measuring the length of feed of the flat sheet which is fed through said roll part; a roll to part for supplying a corrugated sheet to overlap the same onto said flat sheet via several rolls; a winding roll of a honeycomb body which is made by folding the overlapping flat and corrugated sheets into a roll; a part for measuring the rotation angle of said winding roll; and a control part which controls the amount of winding in a roll of a honeycomb body by means of computing the measurement values from said part for measuring the length and said part for measuring the rotation angle.

BRIEF DESCRIPTION OF THE DRAWINGS

Other objects and advantages of the invention will become apparent upon reading the following detailed description and upon reference to the accompanying drawings in which.

Figure 1:
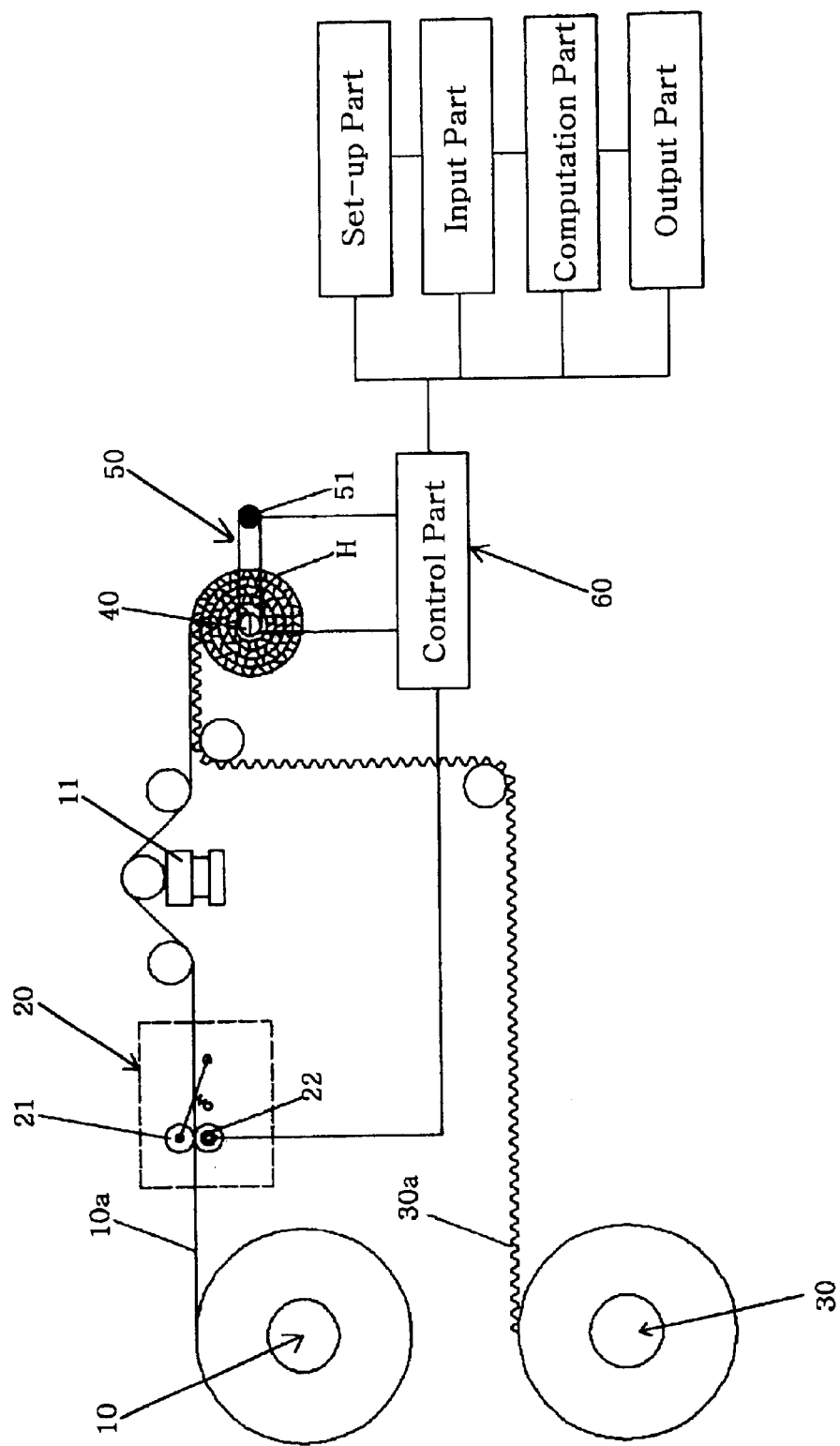
FIG. 1 illustrates an apparatus for producing a honeycomb body.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

Referring to the drawings, FIG. 1 shows a roll part 10 for supplying a thin metal flat sheet 10a via several rolls; a part 20 for measuring the length of feed of the flat sheet 10a which is fed through said roll part 10; a roll part 30 for supplying a corrugated sheet 30a to overlap the same onto said flat sheet 10a via several rolls; a winding roll 40 of a honeycomb body H which is made by folding the overlapping flat and corrugated sheets 10a and 30a in feed into a roll; a part 50 for measuring the rotation angle of said winding roll 40; and a control part 60 with pre-stored set values (e.g., the inner circumference of an outer shell), which is connected respectively to said part 20 for measuring the length and said part 50 for measuring the rotation angle, wherein said control part 60 controls the amount of winding for a honeycomb body by receiving and computing the measurement values therefrom.

Honeycomb body H is made by supplying flat sheet 10a via roll part 10 to winding roll 40; further supplying corrugated sheet 30a via roll part 30 to winding roll 40; and overlapping said flat and corrugated sheets 10a and 30a at winding roll 40 and folding the same into a roll in the form of a honeycomb. The values measured respectively at part 20 for measuring the length and part 50 for measuring the angle are sent to control part 60. Control part 60 stops the winding operation of winding roll 40 when the computed value from the measurements equals the pre-stored value (e.g., the inner circumference of an outer shell), after which leads to completion of one honeycomb body H.

After the completion of honeycomb body H, flat and corrugated sheets 10a and 30a are cut, after which the winding operation is once again initiated. For the sequence of cutting the flat and corrugated sheets 10a and 30a, it is preferable to cut the corrugated sheet first, followed by the flat sheet. The amount of the corrugated sheet has a major effect on the outer circumference of honeycomb body H. As such, it is preferable to cut the corrugated sheet by closely adhering it, to the maximum extent possible, to the honeycomb body in a roll. In this way, after first cutting the corrugated sheet, the winding axis is additionally rotated to a certain degree. The flat sheet is fixated by using a spot welding machine to prevent unfolding of the honeycomb body, after which the flat sheet is cut. In this manner, the winding operation of the honeycomb body is thus completed.

The shape of a honeycomb body is not of a round form but of a warped spiral that cannot be inserted into a cylindrical outer shell with precision. In other words, in order to adhere the outer most wall of a honeycomb to the outer shell in its entirety by precisely inserting the honeycomb body into the cylindrical outer shell with a round cross-section, the outer circumference of a honeycomb body in a roll must equal the inner circumference of the outer shell, irrespective of the outer diameter. However, it may be difficult to directly measure the outer circumference of a honeycomb body, and therefore, the method of measuring the amount of a strip consumed per rotation of a winding roll is used.

The method involves equally dividing one rotation (i.e., 360°) of a winding roll into N units according to the desired precision level, and then measuring the length of a strip consumed per rotation during the operation of 1~N times. Even after a rotation of 360°, if the length thereof is less than the preset value (i.e., the value corresponding to the length of the inner circumference of an outer shell), it is reset to N=0 for repeating the above operation. When the desired length is reached, the operation is stopped.

In using this method, the precision thereof may become considerable according to the degree of equal division per rotation of a winding roll or a device for measuring the length. Moreover, by this method, a honeycomb body with precise adhesion to the outer shell may be produced.

At part 20 for measuring the length, the length of flat sheet 10a consumed during the process of folding honeycomb body H into a roll is measured accumulatively from the start, and the values thereof are turned over to control part 60. As the winding operation progresses, roller 21 for measuring the length rotates, and encoder 22 for measuring the length, which is coupled to said roller, calculates the length of the strip so consumed therein. In order to prevent slipping, without sensing the progression of the strip, roller 21 for measuring the length should preferably be of rubber or a material with similar adhesion. By way of sufficient pressure, roller 21 has the role of preventing such slippings. Further, in order to minimize the effect of the operation of measuring the length as above on the control of tension to the honeycomb body, load cell 11 for sensing tension, as shown in FIG. 1, is installed immediately posterior to part 20 for measuring the length.

As for part 50 for measuring the angle as above, for the purpose of operation simplification, the point at which the breaking from winding roll 40 is level with the ground, is set to 0°. From this point, the winding operation is initiated. After starting the winding operation, encoder 51 for measuring the angle, installed onto winding roll 40, measures the rotation angle of winding roll 40 and transfers the measurement values to control part 60.

Control part 60 includes a set-up part which sets the length of the outer circumference of honeycomb body H to be produced and then pre-enters those set values; an input part which receives the values read by said part for measuring length 20 and part 50 for measuring the angle; a computation part which carries out the computation for stopping the winding operation at a desired length based on the values entered from said input part; and an output part which transmits the signals from said computation part to winding roll 40.

Figure 2:
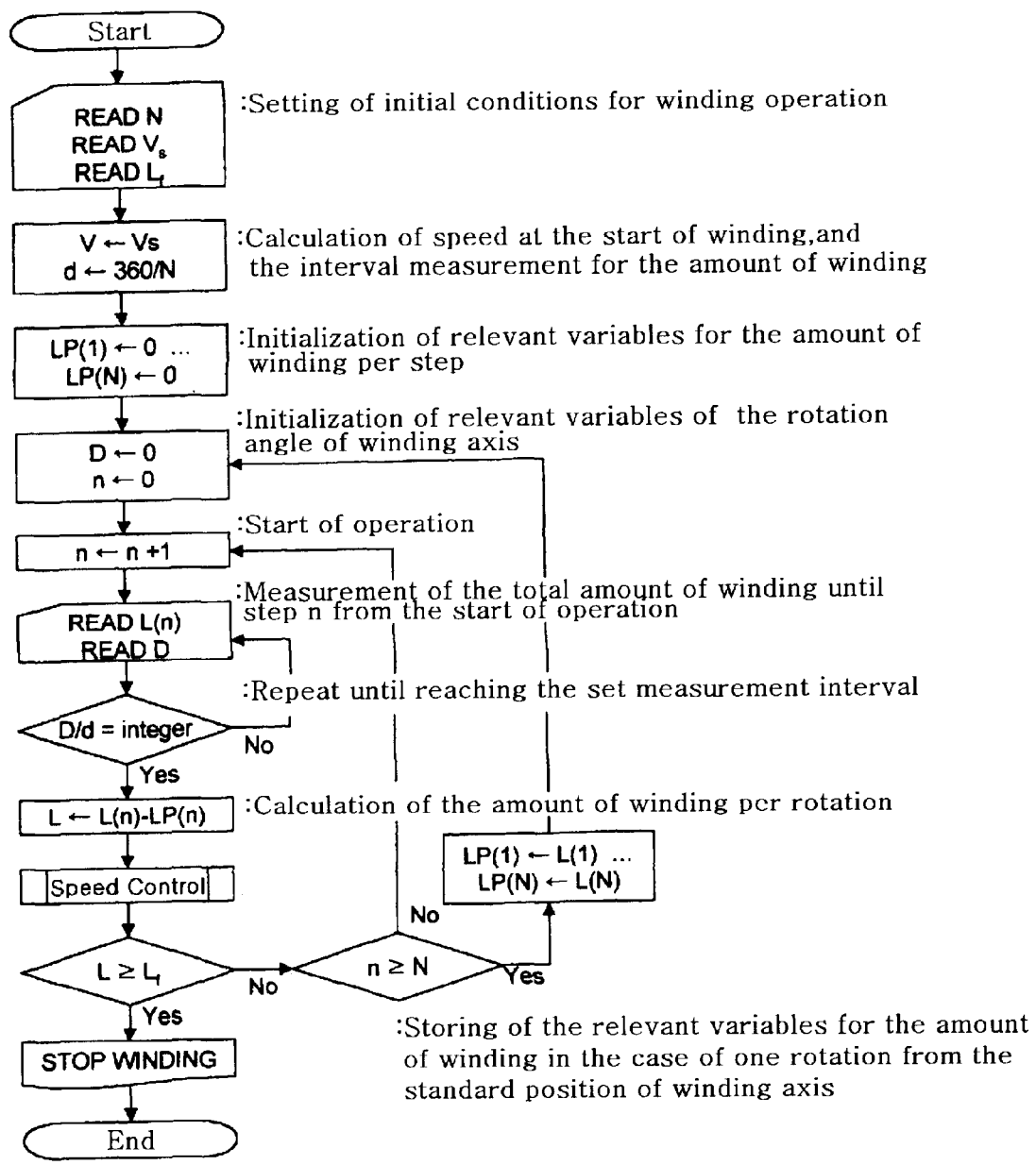
FIG. 2 illustrates a flowchart of the main program for length control of the control part.

For reference, the symbols used in the flowchart of FIG. 2 are as follows:

| | |
|---|---|
| N | the value of equal division per rotation by a winding roll; |
| n | step (integer); |
| V | actual rotation speed of the winding roll; |
| $V_s$ | rotation speed of the winding roll at the start of the operation; |
| S | a factor related to the rotation speed of the winding roll; |
| L | the consumption amount of a strip until step n from prior to 360°; |
| $L_f$ | the final length of outer circumference; |
| L(n) | the total consumption amount of a strip until step n after the start of the operation; |
| LP(n) | the total consumption amount of a strip until one rotation prior to step n from the start of the operation; |
| d | the interval for equal division of the rotation angle used in the measurement of the amount of winding of a strip; and |
| D | the actual rotation angle of the winding roll. |

At the computation part, as shown in FIG. 2, the stopping point for the winding operation is calculated by comparing the length of the strip consumed per rotation of a winding roll with the pre-entered set values. In other words, the, computation part reads the following values: the value (N) of equal division for one rotation by a winding roll, which is a set value corresponding to the initial condition of the winding operation, the rotation speed ($V_s$) of the winding roll at the start of the operation, and the final value for the length of the outer circumference of the honeycomb body ($L_f$). Moreover, the computation part calculates the interval (d) of equal division of rotation angle, which in turn is used in the measurement of the actual rotation speed (V) of a winding roll and the amount of winding with respect to a strip. As set above, the $N^{th}$ number of steps is produced per rotation of winding roll axis. As such, the rotation angle (D) of a winding roll, the steps (n), etc., are initialized to 0 so that the variable (LP(n)), which stores the length of a strip in a roll, prior to one rotation per respective step, and the current position of the winding axis are recognized as 0°. From the start of the winding operation, as it progresses from step 1 to n, during its progression from the prior position to the current position to the extent of one rotation, the amount of a strip (L) in a roll is calculated per angle of equal division of the aforementioned setting. This value is computed by limiting the total length (LP(n)) of the strip consumed prior to one rotation of the current position after the start of the operation from the total length (L(n)) of the strip consumed until the current position after the start of the operation. If the length (L) of the strip consumed in one rotation is less than the final set value of length of the outer circumference ($L_f$), it proceeds to the next step (n=n+1). Then, in completion of the $N^{th}$ step of the operation, it proceeds until 1~n steps. Meanwhile, the total consumption amount (L(n)) of the strip per respective step as read is substituted to the total consumption amount (LP(n)) of the prior step, after which it is restarted from step 1. If the length (L) of the strip consumed by one rotation is more than the final value of length ($L^f$) of the outer circumference, the winding operation is terminated.

Figure 3:
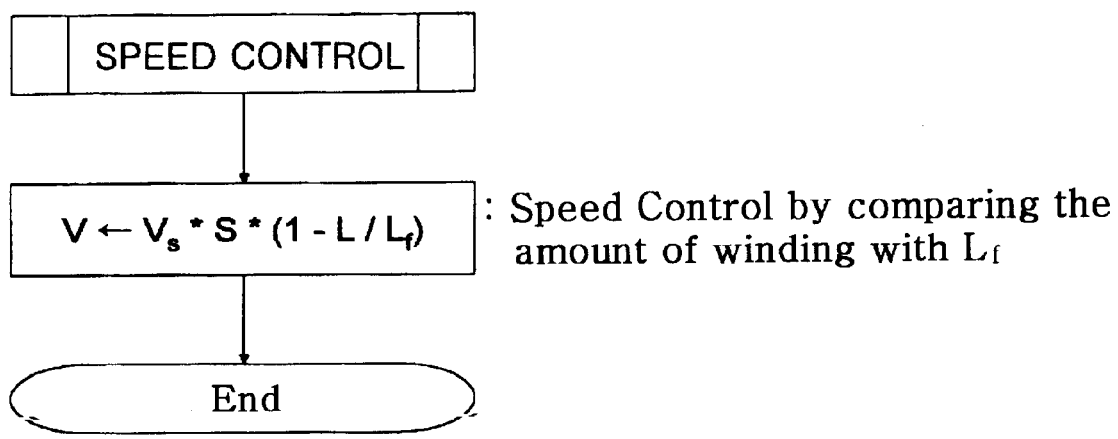
FIG. 3 illustrates a flowchart for the speed control subroutine program of the control part.

On the other hand, if necessary, in order to precisely control the amount of winding, the subroutine program of FIG. 3 may be used to increase the rotation speed of the winding roll as the amount of wind is increased (i.e., as the radius of the honeycomb is increased). In this way, errors, which may be generated from the delay in computation time of the program, could be minimized.

In this manner, the amount of winding may be more accurately controlled by means of speed control. Further, by increasing the rolling speed from the start to the middle of the operation, the production time per unit of a honeycomb may be reduced, which in turn may be applied to the operation of mass production.

As shown above, the apparatus for producing a honeycomb body has the effect of producing a honeycomb body of the optimal size, which can be accurately inserted into an outer shell by means of measuring the amount of a strip consumed in the continuous production of honeycomb bodies during the winding operation.

Further, it is anticipated that the apparatus would have the effect of total inspection by means of controlling the size of a honeycomb body into an appropriate size by using a relatively simple program.

As for the conventional method of measuring outer diameter, or the method of measuring length, many trials and errors were necessary for producing honeycomb bodies of one size. However, the embodiment described herein can produce honeycomb bodies of uniform size without such trials and errors, which in turn leads to an increase in productivity in term of its application to small-lot production of a variety of product types.

Further, the effect of reducing production time per unit of a honeycomb body by means of controlling the rolling speed according to the increase in the radius of winding of the honeycomb body may be applied to the operation of mass production.

Further modification and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. An apparatus for producing a honeycomb body, comprising:
   a first roll part configured to supply a thin metal flat sheet via several rolls;
   a first part configured for measuring a value of a length of a feed of the flat sheet as the flat sheet is fed through the first roll part;
   a second roll part configured to supply a corrugated sheet, such that the corrugated sheet overlaps onto the flat sheet via several rolls;
   a winding roll for a honeycomb body, wherein the winding roll is made by folding the overlapping flat sheet and the corrugated sheet into a roll;
   a second part for measuring a value of a rotation angle of the winding roll; and
   a control part, coupled to the first part and the second part, wherein the control part comprises:
      a set-up part configured to set a length of the outer circumference of the honeycomb body to be produced;
      an input part configured to receive one or more values from the first part and one or more values from the second part;
      a computation part configured receive values from the input part and to carry out a computation to stop the winding operation at a desirable length based on the values received from the input part; and
      an output part, wherein the output part transmits one or more signals from the computation part to control the winding roll.

2. The apparatus of claim 1, comprising a load cell for sensing tension of a flat sheet at the posterior of the first part for determining a value for the length of feed.

3. The apparatus of claim 1, wherein the first part comprises a roller for measuring the length of a flat sheet as the winding operation of a flat sheet proceeds and an encoder coupled to the roller; the encoder configured to determine a value for the length of feed consumed therein.

4. The apparatus of claim 3, wherein the roller comprises an adhesion material, wherein the adhesion material is rubber.

5. The apparatus of claim 1, wherein the second part comprises a roller for measuring the rotation angle of the winding roll, and an encoder coupled to the roller, the encoder being configured to determine a value for the rotation angle of the winding roll.

6. The apparatus of claim 1 wherein a set value of the set values comprises an inner circumference of an outer shell, wherein the honeycomb body inserts into the inner circumference of the outer shell.

7. The apparatus of claim 1, wherein a set value of the set values comprises a number of equal divisions for one rotation of the winding roll.

8. The apparatus of claim 1, wherein a set value of the set values comprises an initial rotation speed of said winding roll.

9. The apparatus of claim 1, wherein the computation part calculates an interval of equal division of rotation angle of the winding roll.

10. The apparatus of claim 1, wherein the computation part calculates an actual rotation speed of the winding roll.

11. The apparatus of claim 1, wherein the computation part calculates an amount of winding of a strip on the winding roll.

12. The apparatus of claim 1, wherein the computation part calculates a length of each rotation until the length of each rotation reaches a pre-set value.

13. The apparatus of claim 1, wherein the control part terminates winding in response to the computation part calculating that the determined length of a rotation exceeds a pre-set value.

14. The apparatus of claim 1, wherein the computation part calculates an increase in speed of the winding roll according to an amount of winding.

15. The apparatus of claim 1, wherein the output part transmits a signal from the computation part to the control part to control the speed of the winding roll.

* * * * *